MAGNETIC VARIATION STORAGE DEVICE FOR NAVIGATIONAL COMPUTER

Filed April 23, 1957

INVENTOR.
SAMUEL ROMANO
BY Wade Koontz
ATTORNEY
and
James S. Shannon
AGENT

United States Patent Office 3,122,725

Patented Feb. 25, 1964

3,122,725

MAGNETIC VARIATION STORAGE DEVICE FOR NAVIGATIONAL COMPUTER

Samuel Romano, Rutherford, N.J., assignor to the United States of America as represented by the Secretary of the Air Force Filed Apr. 23, 1957, Ser. No. 654,625

3 Claims. (Cl. 340—174.1)

Figure 1:
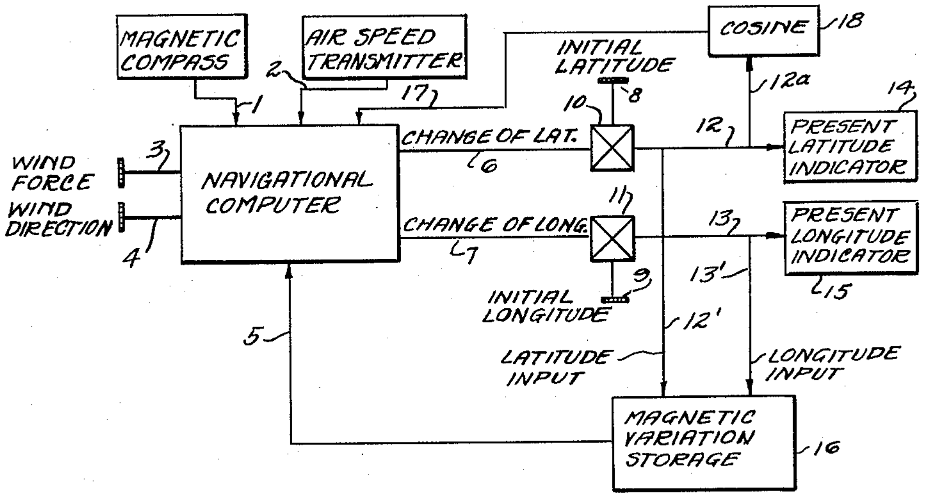

This invention relates to storage devices and particularly to a storage device that is well suited for storing magnetic variation information for use in a navigational computer for aircraft.

Since magnetic variation is a function of both latitude and longitude the device in effect stores a function of two independent variables and is analogous to a three dimensional cam where the rotation of the cam corresponds to one variable, the axial position of the follower corresponds to the other variable and the lift of the follower represents the value of the function.

The principal objects of the invention are to provide a storage device of the above type that is light in weight, easy to produce and in which the stored information can be quickly and simply changed. Briefly, this is accomplished by using a cylinder having a magnetizable surface and rotated at a constant speed. Information is recorded on this surface in the form of magnetic pulses by means of a magnetic recording-reading head positionable axially of the surface in accordance with latitude. The position of the record with respect to longitude, measured around the surface, is controlled by a commutator rotating at the same speed as the cylinder and adjustable in phase relative to the cylinder in accordance with longitude. The commutator is connected in the electrical circuit to the recording-reading head and serves to momentarily close this circuit once during each revolution of the cylinder. The closure interval is sufficiently small that the longitudinal distance passing beneath the head during the interval is less than that in which any appreciable change in magnetic variation would occur.

Figure 2:
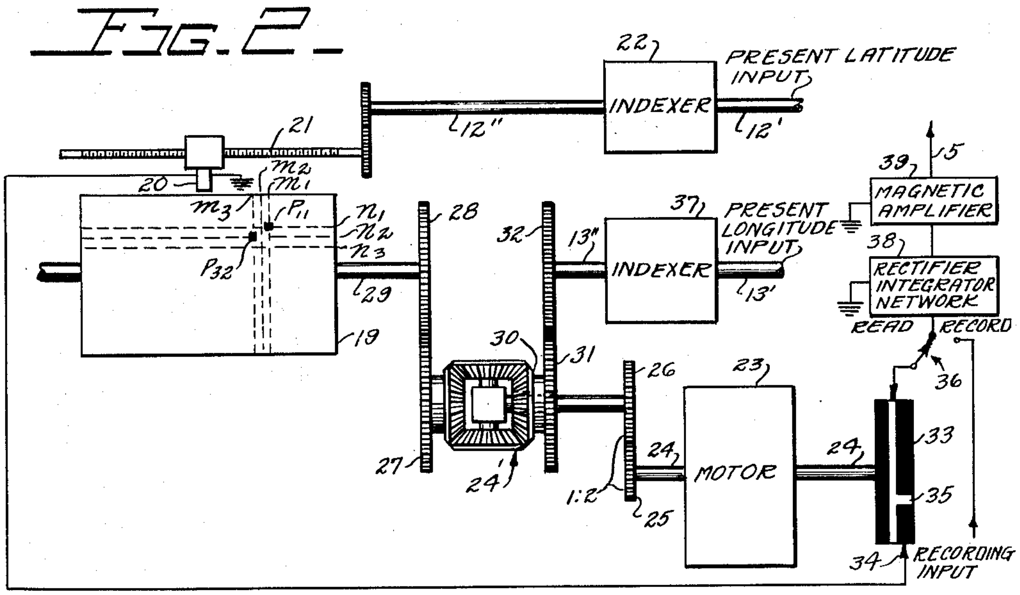

A more detailed description of the invention will be given in connection with the embodiment thereof shown in the drawings, in which:

FIG. 1 is a block diagram of a navigational computer using the magnetic variation storage device; and FIG. 2 is a schematic diagram of the storage device.

Referring to FIG. 1, the navigational computer shown computes the change in latitude and longitude of an aircraft during flight and, by adding these changes to the latitude and longitude at the start of the flight, continuously indicates the present latitude and longitude of the aircraft. The computer has inputs of magnetic heading 1, air speed 2, wind force 3, wind direction 4, cosine of latitude 17 and magnetic variation 5, the last used to correct magnetic heading to true heading. The form which input 5 will take depends upon the design of the computer, but, for example, it may be a direct voltage the amplitude of which is proportional to the magnetic variation. The input 17 is derived from cosine function generator 18 which has an input shaft 12*a* the rotation of which is equal to or proportionate to the rotation of shaft 12. The output of the function generator is proportional to the cosine of the latitude and is applied to the computer for the purpose of compensating for the change in longitudinal distance with latitude.

From these inputs the computer determines the changes in latitude and longitude that have occurred since the start of the flight. The outputs giving these changes may conveniently be in the form of proportionate rotations of shafts 6 and 7. The changes in coordinates thus represented are added algebraically to the initial latitude and longitude, set at the start of the flight by knobs 8 and 9, by means of differentials 10 and 11 so that the rotations of shafts 12 and 13 are proportionate to present latitude and longitude which are displayed on indicators 14 and 15.

The magnetic variation input 5 is stored as a function of latitude and longitude in storage device 16. As seen in FIG. 2, this device employs a cylinder 19 having a magnetizable surface on which latitude is measured in an axial direction and longitude in a circumferential direction, the scale being such that the desired area of the earth's surface is accommodated. Magnetic variation information is magnetically recorded at discrete locations over the cylindrical surface. For example, the magnetic variation at latitude $m_1$ and longitude $n_1$ is recorded over an area centered about $p_{11}$, the variation at latitude $m_3$ and langitude $n_2$ is recorded about point $p_{32}$, and so on. Since these areas have a finite size in both latitude and longitude the magnetic variation recorded therein must serve for all points lying within the corresponding elemental area on the earth's surface. The size of the elemental area therefore should be sufficiently small that the magnetic variation, which is a continuous function over the earth's surface, does not change appreciably within its boundaries.

Since the elemental areas lie at the intersections of parallel equally spaced circumferential circles with equally spaced axial lines on the cylindrical surface, a corresponding indexing of recording-reading head 20 in both latitude and longitude is required. This necessitates a suitable indexing mechanism between the continuously rotatable input shafts 12′ and 13′ and the latitude and longitude positioning mechanisms for the magnetic head. The head is positioned in latitude by lead screw 21 which is driven from shaft 12″ which in turn is indexed by indexer 22. The mechanism 22 has one index point for each index position in latitude on cylinder 19 and accurately positions the head at these index positions for corresponding ranges of latitude angles on shaft 12′. As stated above, the separation of index positions is sufficiently small that an inconsequential change in magnetic variation occurs in the corresponding distance on the earth. For example, if the separation is made 0.1°, the operation of indexer 22 is such that head 20 will be at the index point corresponding to 20.00° latitude, for example, for all positions of shaft 12′ corresponding to latitude angles within the range 19.95°–20.05°, and will be at the index point 20.1 for all positions of shaft 12′ corresponding to latitude angles within the range 20.05°–20.15°, etc. Any of the known mechanisms for accomplishing this result may be used for indexer 22.

The indexing of head 20 in longitude is complicated by the necessity for maintaining a constant relative motion between the cylindrical surface 19 and the head 20 to enable the magnetic flux representing the information stored in the surface to induce voltages in the head. This motion is provided by motor 23 which rotates cylinder 19 at constant speed through shaft 24, gears 25—26, the gears of differential 24′, gears 27—28 and shaft 29, differential gear 30 being held stationary by gears 31 and 32 at a position determined by the longitude input on shaft 13′. The 2:1 speed reduction of gears 25—26 cancels the 2:1 speed multiplication of the differential so that the cylinder rotates at the same speed as shaft 24 and commutator 33 mounted on this shaft. This commutator, by means of wiper 34 and contact 35, connects the recording head to the read or record external circuits, depending upon the position of switch 36, once during each revolution of cylinder 19. The indexer 37, which is similar in all respects to and performs the same function as indexer 22, insures that one of the elemental storage areas of the cylinder passes beneath head 20 at the same time that wiper 34 passes across appropriately wide contact 35 for all positions of longitude input shaft 13′. As shaft 13″ indexes, gear 32 acts through gear 31 to change the angular position of differential gear 30 and thus change the rotational phase of cylinder 19 relative to commutator 33 so as to read or record on the elemental area corresponding to the longitudinal input on shaft 13′.

Any of the known methods of magnetic recording may be used to record magnetic variation information on the cylinder 19. For example, the information may be recorded in analog form as a series of equally spaced rectangular pulses of magnitude proportional to the magnetic variation, or as a sine wave with amplitude proportional to the magnetic variation. The output of the head is then rectified and integrated by network 38 to produce a direct voltage which is further amplified in amplifier 39 before application to the navigational computer. The information may also be recorded in digital form, using a serial binary code. In this case the network 38 would be replaced by a suitable decoder.

What is claimed is:

1. A device for storing values of a function of two independent variables comprising a cylinder having a magnetizable surface, a magnetic recording-reading head, means supporting said head in operative relationship to said surface comprising means for positioning said head in a direction parallel to the axis of said cylinder in accordance with one of said independent variables, means for rotating said cylinder about its axis at constant speed, a cyclic switching means connected between said head and an external circuit and operative once during each cycle to connect said head to the external circuit for a small portion of the cycle, a coupling between said cylinder and said cyclic switching means for cycling said switching means at a period equal to the rotational period of the cylinder, and means forming part of said coupling means and actuated by the other of said independent variables for varying the rotational phase of said cylinder relative to the cycle of said switching means in accordance with said other independent variable.

2. A device for storing values of a function of two independent variables comprising a cylinder having a magnetizable surface and mounted for rotation about its axis, a magnetic recording-reading head, means supporting said head in operative relationship to said surface comprising means for positioning said head in a direction parallel to the axis of said cylinder in accordance with one of said independent variables, a cyclic switching means connected between said head and an external circuit and operative to connect said head to the external circuit for a short period once during each cycle of operation, a constant speed motor, couplings between said cylinder and said motor and between said cyclic switching means and said motor for rotating said cylinder at constant speed and for operating said cyclic switching means at a period equal to the rotational period of said cylinder, and means in the coupling between said motor and said cylinder for varying the rotational phase of said cylinder relative to the cycle of said switching means in accordance with the other of said independent variables.

3. Apparatus as claimed in claim 2 in which the said other independent variable is in the form of a shaft rotation and the phase varying means is a mechanical differential.

References Cited in the file of this patent

UNITED STATES PATENTS

| | | |
|---|---|---|
| 2,163,746 | Courtois-Suffit et al. | June 27, 1939 |
| 2,406,836 | Holden | Sept. 3, 1946 |
| 2,597,866 | Gridley | May 27, 1952 |
| 2,702,380 | Brustman | Feb. 15, 1956 |
| 2,739,299 | Burkhart | Mar. 20, 1956 |
| 2,752,091 | McKenney | June 26, 1956 |
| 2,876,428 | Skelton et al. | Mar. 3, 1959 |
| 2,957,742 | Carbonara | Oct. 25, 1960 |